K. H. WIMMER.
PROCESS OF OBTAINING COFFEE FREE FROM CAFFEIN.
APPLICATION FILED APR. 10, 1908.
936,392.
Patented Oct. 12, 1909.
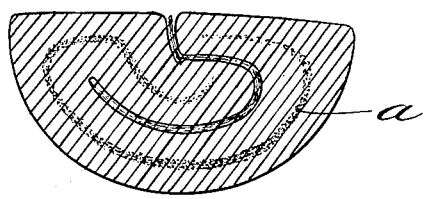
Witnesses
Inventor
Karl Heinrich Wimmer
By
James L. Norris
Atty.

UNITED STATES PATENT OFFICE.

KARL HEINRICH WIMMER, OF BREMEN, GERMANY.

PROCESS OF OBTAINING COFFEE FREE FROM CAFFEIN.

936,392.  Specification of Letters Patent.  Patented Oct. 12, 1909.

Application filed April 10, 1908. Serial No. 426,275.

*To all whom it may concern:*

Be it known that I, KARL HEINRICH WIMMER, a subject of the German Emperor, residing at Bremen, Germany, have invented a certain new and useful Process of Obtaining Coffee Free from Caffein, of which the following is a specification.

In the extraction of green unbroken coffee beans by means of volatile extracting media or solvents, such as benzene, chloroform and ether, less than one per cent. of the extractive matter, and only traces of caffein enter into solution, on the other hand finely pulverized coffee yields about 15 per cent. of the extractive matter to the same extracting media. It follows, that any process having for its object to produce coffee free from caffein, should, in order to be of practical value, provide means for depriving green coffee beans of their caffein, because this is the only way to avoid great waste of extractive matter and to retain the aroma and taste of the coffee. Another reason is, that ground coffee cannot be roasted nearly so well and uniformly, as unbroken coffee beans.

Careful experiments have shown, that it is possible to deprive the unbroken green coffee beans (both peeled and unpeeled) of caffein by means of volatile solvents, if they are subjected before the extraction to a suitable preliminary treatment and then solvents of caffein are caused to act on the same. The preliminary treatment is based on the morphological condition or structure of the coffee bean. The surface of the endospermic body consists of small isodimetric cells, whose walls or membranes are thick, brilliant and spotless. The more deeply situated cells are considerably larger and provided with coarse thickening strips connected with each other in net fashion, so that the wall has the appearance of a string of pearls or beads.

In the center of transverse and longitudinal sections through the entire coffee bean there is a wide and dark line visible to the naked eye.

The accompanying drawing represents a transverse section of a green coffee bean wherein the dark line just described is designated by the character *a*, this line extending longitudinally as well as transversely of the bean.

A microscopic examination of the central layer shows that the cells of these layers are stretched in a tangential direction and that some are in various stages of decomposition.

Careful experiments have shown, that it is possible, to deprive the unbroken coffee bean of the whole of the caffein, except mere traces, by first causing moist heat or hot vapors to act on the bean, but only until the external layers of cells down to the dark line mentioned above have likewise assumed a darker color. This moment can be easily ascertained by taking test samples and looking at the bean, which has been cut through. The said effect may be produced by exposing the coffee beans inclosed in a revolving apparatus to an atmosphere of steam, if necessary, at a moderate pressure. During this preliminary treatment the apparatus containing the beans is preferably connected with a reflux cooler, adapted to condense the volatile oils and vapors escaping from the apparatus and to return the same to the apparatus, so as to avoid waste of aromatic substances and of moisture. After this preliminary treatment the caffein may be extracted from the coffee beans by suitable solvents. For this purpose the beans are preferably introduced into extraction appliances, through which the solvents flow (such as chloroform, benzene, ether or mixtures of the same, or emulsions of the same with water), during which process the caffein is dissolved out of the beans, which are preferably kept in motion. During this operation also moist heat may be applied by the admission of steam. When the caffein has been extracted from the beans, they are during the rotation of the apparatus, relieved of any extraction medium adhering to the same, by heating and treatment with steam, and finally they are dried.

What I claim is:—

1. The process of obtaining coffee beans free from caffein, which consists in treating the green coffee beans with heated vapor, until the external layer down to the dark central line existing in green coffee beans has assumed a dark color, then subjecting the beans to extraction with solvents for caffein, and finally treating them with steam and drying them, substantially as described.

2. The process of preparing coffee beans free from caffein, which consists in treating the green beans with heated vapor, until the external layer down to the dark central line existing in green coffee beans has assumed a dark color, condensing the volatile substance escaping during this operation and returning it to the beans which are being treated, then subjecting the beans to a solvent for extracting the caffein therefrom, then treating them with steam, and drying, substantially as described.

3. The process of preparing coffee beans free from caffein, which consists in treating green coffee beans with heated vapor under pressure, until the external layer down to the dark central line existing in green coffee beans has assumed a dark tint, condensing the volatile substances escaping during this operation and returning them to the beans which are being treated, then extracting the beans with a solvent for caffein, while keeping them in motion, and then treating them with steam and drying, substantially as described.

4. The process of preparing coffee beans free from caffein, which consists in treating the green coffee beans with heated vapor under pressure until the external layer down to the dark central line existing in green coffee beans has assumed a dark tint, condensing the volatile substances escaping during this operation and returning them to the beans which are being treated, then extracting the beans with mixtures of solvents for caffein, while keeping them in motion, and finally treating them with steam and drying, substantially as described.

5. The process of preparing coffee beans free from caffein, which consists in treating green coffee beans with heated vapor under pressure, until the external layer down to the dark central line existing in green coffee beans has assumed a dark tint, condensing the volatile substances escaping during this operation and returning them to the beans which are being treated, then extracting the coffee beans with an emulsion prepared from caffein-solvents and water, while keeping them in motion and finally treating them with steam and drying.

6. A process of preparing coffee free from caffein, which consists in moistening the green coffee beans and applying heat until the external layer thereof down to the dark central line existing in the beans has changed its color, then subjecting the beans to a solvent for extracting the caffein, and finally subjecting the beans to steam and drying them.

7. A process of preparing coffee free from caffein, which consists in moistening the green coffee beans and applying heat until the external layer thereof down to the dark central line existing in the beans has changed its color, condensing the volatile substance escaping during the moistening of the beans and returning it to the beans which are being treated, then subjecting the beans to a solvent for extracting the caffein, and finally subjecting the beans to steam and then drying them.

8. A process of preparing coffee free from caffein, which consists in moistening the green beans with hot vapor until the external layer thereof down to the dark central line existing in the beans has changed its color, then subjecting the beans to a solvent for extracting the caffein, and finally subjecting the beans to steam and drying them.

9. A process of preparing coffee free from caffein, which consists in moistening the green beans with hot vapor until the external layer thereof down to the dark central line existing in the beans has changed its color, condensing the volatile substance escaping during the moistening of the beans and returning it to the beans which are being treated, then subjecting the beans to a solvent for extracting the caffein, and finally subjecting the beans to steam and then drying them.

In testimony whereof I have hereunto set my hand in presence of two subscribing witnesses.

KARL HEINRICH WIMMER.

Witnesses:
 FERDINAND REICH,
 FREDERICK HOYERMANN.